No. 689,072. Patented Dec. 17, 1901.
A. FEATHERSTONHAUGH.
ROLLER BEARING.
(Application filed May 31, 1901.)
(No Model.) 2 Sheets—Sheet 1.
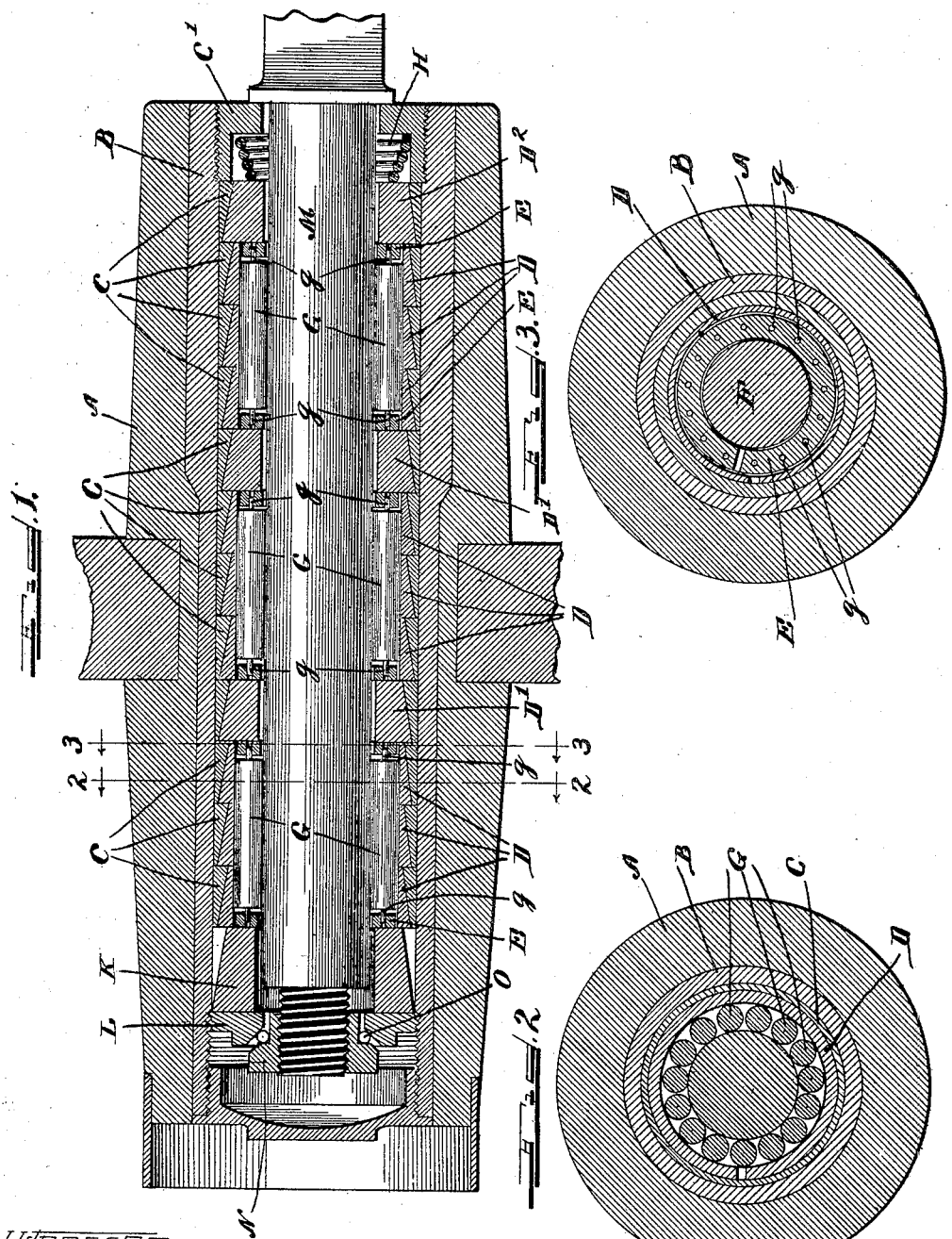

No. 689,072. Patented Dec. 17, 1901.
A. FEATHERSTONHAUGH.
ROLLER BEARING.
(Application filed May 31, 1901.)
(No Model.) 2 Sheets—Sheet 2.
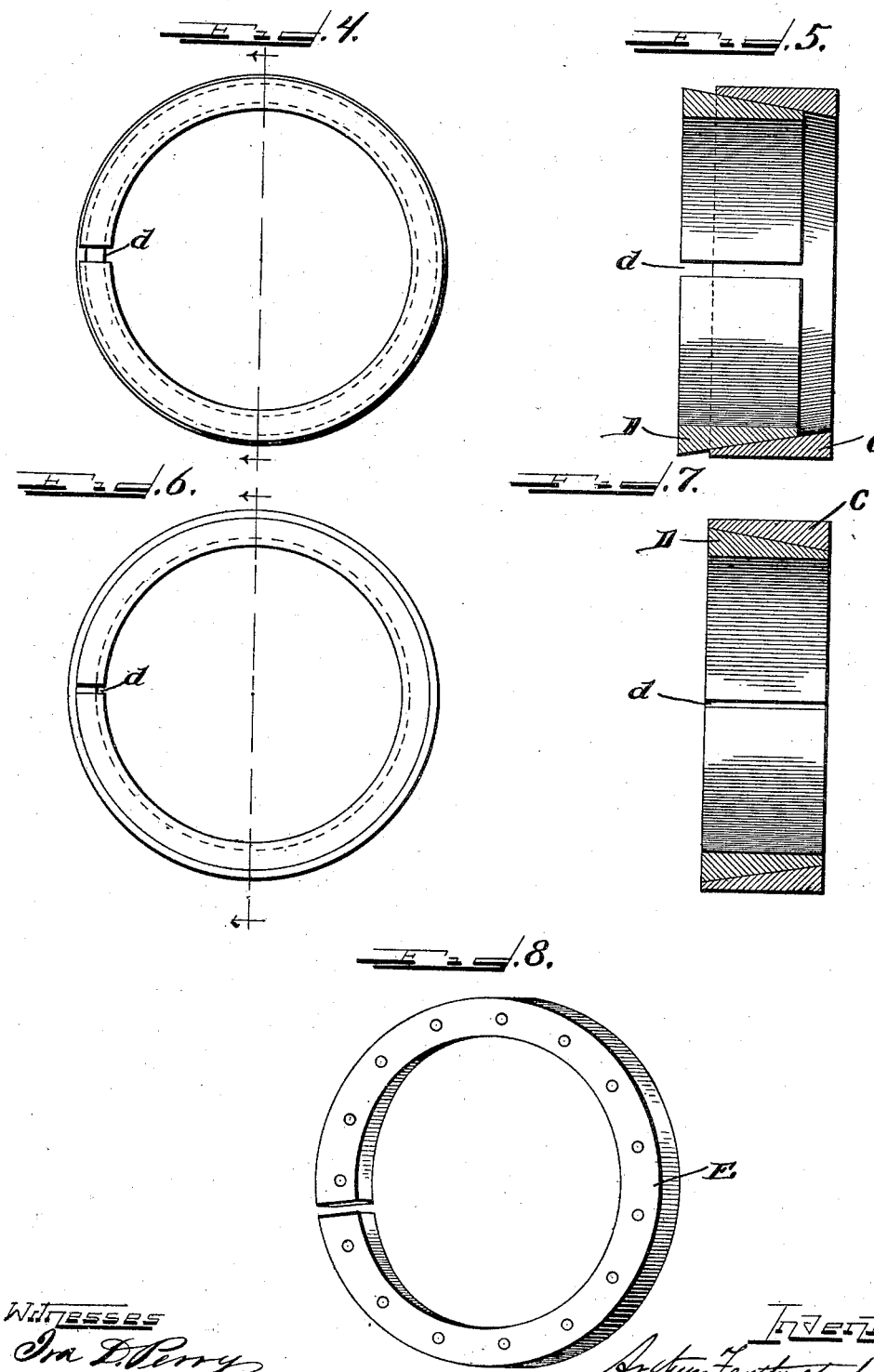

UNITED STATES PATENT OFFICE.

ARTHUR FEATHERSTONHAUGH, OF CHICAGO, ILLINOIS, ASSIGNOR OF ONE-HALF TO PORTER FITZGERALD, OF CHICAGO, ILLINOIS.

ROLLER-BEARING.

SPECIFICATION forming part of Letters Patent No. 689,072, dated December 17, 1901.

Application filed May 31, 1901. Serial No. 62,478. (No model.)

*To all whom it may concern:*

Be it known that I, ARTHUR FEATHERSTONHAUGH, a citizen of the United States of America, residing at Chicago, in the county of Cook and State of Illinois, have invented certain new and useful Improvements in Roller-Bearings, of which the following is a description.

My invention belongs to that class of antifriction devices in which a series of rollers are interposed between the movable parts to reduce the friction.

The object of my invention is to produce a more simple, effective, and durable device than is now available for the purpose stated.

To this end my invention consists in the novel construction, arrangement, and combination of parts herein shown and described, and more particularly pointed out in the claims.

In the drawings, wherein like reference-letters indicate like or corresponding parts, Figure 1 is a longitudinal section through a carriage-hub equipped with my improved device. Fig. 2 is a transverse section in line 2 2 of Fig. 1. Fig. 3 is a similar section in line 3 3 of Fig. 1. Fig. 4 is an end elevation of the adjusting-rings in one position. Fig. 5 is a longitudinal section of the same. Fig. 6 is an end elevation of the rings in another position. Fig. 7 is a longitudinal section of the same, and Fig. 8 is a view of one of the cage-rings.

In the drawings I have shown my improvement as applied to a carriage-hub in which the hub carrying the roller-bearing rotates about a fixed axle or shaft. It is obvious, however, that my improvement is equally applicable to all kinds of bearings, as well to those in which the shaft rotates in the bearings as in the form shown in the drawings.

As shown in the drawings, A represents an ordinary carriage-hub provided with an inner inclosing shell B.

C C, &c., are rings arranged edge to edge within the shell and are provided with conically-formed center openings, which when the rings are in position extend in the same general direction. One end of the column of rings bears against an abutment, as C', thus maintaining the column in a relatively fixed position within the shell B.

D D are compressible rings, which may be opened upon one side, as shown, and which have conical exteriors corresponding to the interiors of the rings C.

E E are cage-rings maintained in position between the large rings D' D', as shown.

G G are rollers maintained in position in the cage-rings by pivots $g$, which retain the rollers in proper relative position to one another. One end of the column of rings—as, for example, the enlarged ring $D^2$—rests against the resilient member H, which in this case is a coiled spring.

K is an adjusting-ring bearing against the outer end of the column of rings D.

L is the adjusting-nut, provided with a screw-thread connection with the shell B. By screwing up the nut L the column of rings D will be pressed inward, moving longitudinally within the rings C, thus reducing the diameter of the inner rings D, which is permitted by reason of the opening in the rings at $d$. (See Figs. 4, 5, 6, and 7.) By this means the shaft-space inclosed by the circle of rollers D may be adjusted to compensate for wear and slight variation in the size of shafting used. As the cage-rings E are also split and carried with the rings D, it is obvious that the diameter of the circle inclosed by the rollers will be reduced, as set forth. The relative positions of the rings C and D are clearly shown in Figs. 4, 5, 6, and 7.

M is the axle or shaft, as the case may be.

As shown in the drawings, N is the bur holding the hub upon the axle, and O O are ball-bearings which take the end thrust, and thus help to reduce the friction.

It is obvious that my improvement is not limited to carriage or other vehicle hubs, but may also be used in all cases where there is a part rotating upon another. Thus it is adapted for reducing friction of shafting within bearings and in all similar constructions. Thus while I have shown in my drawings a carriage-hub I do not wish to be understood as limiting myself in that respect.

In the preferred form the rollers G are spaced from one another, as shown in Fig. 2, to reduce friction. It is immaterial which column of rings is longitudinally movable to adjust the parts or whether both are movable for this purpose. It is also obvious that any suitable means may be employed to thus adjust the two, the method shown being preferred.

Having thus described my invention, what I claim as new, and desire to secure by Letters Patent, is—

1. A roller-bearing comprising an inclosing shell, a plurality of outer rings arranged edge to edge within the shell and provided with conically-formed center openings extending in the same general direction, in combination with a plurality of compressible inner rings provided with corresponding conical exteriors arranged edge to edge and partially nested in the outer rings, a series of rollers inclosed by the inner rings forming a shaft-bearing, means for maintaining the rollers in their relative positions, and means for moving the two columns of rings relatively upon one another to regulate the size of the shaft-opening inclosed by the rollers, substantially as described.

2. A roller-bearing comprising an inclosing shell, a plurality of outer rings arranged edge to edge within the shell and provided with conically-formed center openings extending in the same general direction, in combination with a plurality of compressible inner rings provided with corresponding conical exteriors arranged edge to edge and partially nested in the outer rings, a resilient bearing for the inner end of the column of inner rings, a series of rollers inclosed by the inner rings forming a shaft-bearing, means for maintaining the rollers in their relative positions, and means for moving the two columns of rings relatively upon one another to regulate the shaft-opening inclosed by the rollers, substantially as described.

3. A roller-bearing, comprising an inclosing shell, a plurality of rings arranged edge to edge within the shell and provided with conically-formed center openings extending in the same general direction, in combination with a plurality of compressible rings, provided with corresponding conical exteriors, arranged edge to edge and partially nested in the outer rings, cage-rings maintained in position by the inner rings, a plurality of rollers forming a shaft-bearing maintained by the cage-rings, and means for moving the two columns of rings relatively one upon the other to adjust the size of the shaft-opening, inclosed by the rollers, substantially as described.

4. A roller-bearing, comprising an inclosing shell, a plurality of rings arranged edge to edge within the shell, and provided with conically-formed center openings extending in the same general direction, in combination with a plurality of compressible rings provided with corresponding conical exteriors arranged edge to edge and partially nested in the outer rings, a resilient bearing for the inner end of the column of inner rings, cage-rings maintained in position by the inner rings, and maintaining a plurality of rollers forming a shaft-bearing, and means for moving the two columns of rings relatively one upon the other, to adjust the size of shaft-opening inclosed by the rollers, substantially as described.

5. A roller-bearing, comprising an inclosing shell, a plurality of rings arranged edge to edge within the shell, and provided with conically-formed center openings extending in the same general direction, in combination with a plurality of compressible rings, provided with conical exteriors, arranged edge to edge and partially nested in the outer rings, compressible cage-rings maintained in position by the inner rings, and engaging a plurality of rollers, and means for moving the two columns of rings relatively one upon another to adjust the shaft-opening inclosed by the rollers, substantially as described.

6. A roller-bearing, comprising an inclosing shell a plurality of rings arranged edge to edge within the shell, and provided with conically-formed center openings, extending in the same general direction, in combination with a plurality of compressible rings, provided with conical exteriors arranged edge to edge and partially nested in the outer rings, one or more of said inner rings being enlarged as D' for the purpose of spacing a plurality of roller-bearings, cage-rings maintained by said spacing-rings, and spacing a plurality of rollers, and means for moving the two columns of rings relatively one upon the other to adjust the size of the shaft-opening inclosed by the rollers, substantially as described.

7. A roller-bearing comprising an inclosing shell, a plurality of rings arranged edge to edge within the shell and provided with conically-formed center openings extending in the same general direction, in combination with a plurality of compressible inner rings, provided with corresponding conical exteriors, arranged edge to edge and partially nested in the outer rings, a resilient bearing for the inner end of the column of inner rings, a nut as L threaded in the shell B and arranged to adjust the relative position of the two columns, and a series of rollers inclosed by the inner rings forming a shaft-bearing, and means for maintaining the rollers in their proper relative positions, substantially as and for the purpose set forth.

8. A roller-bearing comprising an inclosing shell a plurality of outer rings arranged edge to edge within the shell, and provided with conically-formed center openings extending in the same general direction in combination with a plurality of compressible inner rings, provided with corresponding conical exteriors, arranged edge to edge and partially nested in the outer rings, a resilient bearing for the inner ends of the column of inner rings, a nut as L threaded in the shell B at the outer end of the same, and arranged to adjust the relative positions of the two columns, antifriction-bearings, to take the end thrust of the two parts, a series of rollers inclosed by the inner rings forming the shaft-bearing, and means for maintaining the rollers in their relative positions, substantially as described.

9. A roller-bearing, comprising compressible cage-rings E, in combination with a plurality of rollers maintained in position by the said cage-rings to form a shaft-opening, and means for adjusting the rings to regulate the size of the shaft-opening, substantially as described.

10. In a device of the kind described, the rollers G, G, and the compressible rings E, E, in combination with the compressible rings D, and the rings C, and means for longitudinally moving the rings C, and E, upon one another, substantially as described.

11. In a roller-bearing the compressible roller-carrying rings E, E, in combination with a plurality of rollers maintained in relative position by said rings, substantially as described.

ARTHUR FEATHERSTONHAUGH.

Witnesses:
JOHN W. HILL,
FLORENCE KING.